Inventors:
Richard W. Dochterman,
Wayne L. R. Henderson,
Wesley W. Brooks,
by  Robert G. Irwin
     Their Attorney.

United States Patent Office 2,882,506
Patented Apr. 14, 1959

2,882,506

CORE CLAMPING MEANS

Wesley W. Brooks, Danville, Ill., Richard W. Dochterman, Fort Wayne, Ind., and Wayne Lee Roy Henderson, Danville, Ill., assignors to General Electric Company, a corporation of New York Application November 12, 1954, Serial No. 468,514

12 Claims. (Cl. 336—210)

This invention relates to laminated magnetic core members, and more particularly to clamping means for holding together the different sections of such a core member.

Where different stacks of laminations of magnetic material are used to make up a single magnetic core, as is common in transformers and reactors, it is necessary that means be provided to hold the stacks, or core sections, in assembled relation, and it is also necessary that they be tightly clamped together to avoid undesirable air gaps between them. In addition, it is desirable that the individual laminations of each section be held together in close relationship for the same reasons and for the additional purpose of preventing an undue amount of magnetostrictive noise. It is desirable to provide a unitary core clamp to achieve these results as economically as possible, both insofar as the manufacture of the clamp is concerned, and with respect to the assembling of the clamp upon the core.

It is, therefore, an object of this invention to provide an improved core clamp which will achieve the desired results as set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in its broadest aspects, provides a core clamp to be used in combination with a laminated core having a plurality of sections. Each section is made up of a plurality of thin superimposed laminations of magnetic material. The sections are arranged in lateral juxtaposition so that they form together at least one continuous side of the core, and each section has a groove extending transversely across the edge of the laminations on that side. The core clamp has a plurality of wedging portions arranged to extend respectively within the grooves. Means are provided to connect the wedging portions together at their ends respectively. The wedging portions are formed with a span smaller than that of the grooves respectively, and at least the two outer wedging portions are offset in their grooves respectively so as to be more adjacent the inner sides thereof. When the wedge portions are flattened in the groove, the inner edges of the outer portions will tightly clamp the sections together, and the engagement of each portion with the edges of its associated groove will hold the individual laminations of each section together. Another feature which may be provided, if so desired, consists of an additional strip extending generally parallel to the wedges, which, when assembled, is positioned over the line of juxtaposition between core sections. This provides a path for stray flux and tends to avoid a decrease in the efficiency of the device. The improved core clamp may be used to clamp any desired number of sections together by appropriate variation in the number of wedge portions.

In the drawings:

Figure 4 is a fragmentary view in perspective of a transformer incorporating a second embodiment of the invention;

Figure 5 is a fragmetary view in perspective of a transformer incorporating a third embodiment of the invention; and Figure 6 is a view in perspective, partly broken away and partly in cross-section, of yet another embodiment of the invention.

Figure 1:
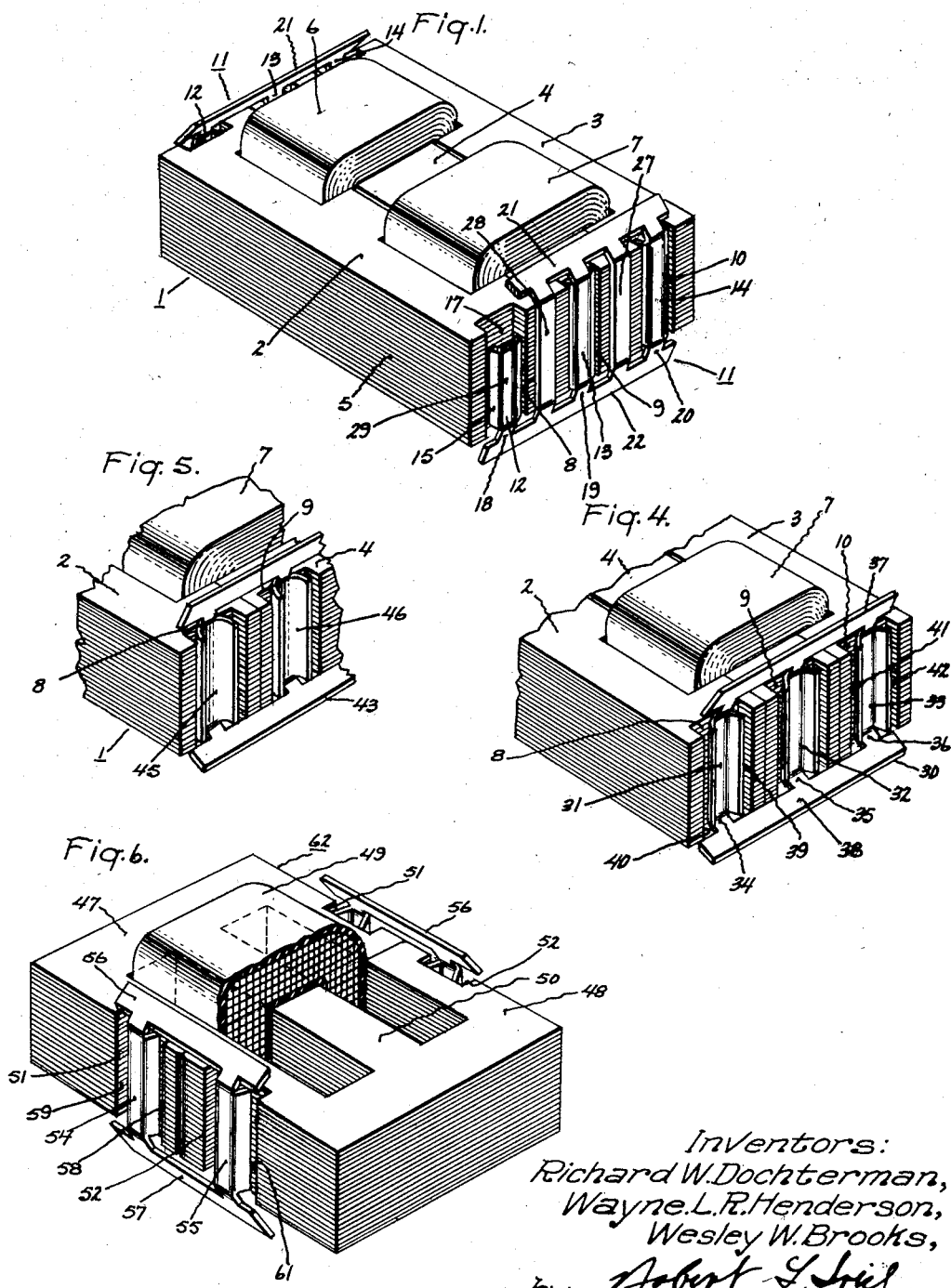
Figure 1 is a view in perspective, partly broken away, of a transformer incorporating the preferred embodiment of the improved clamping means of this invention.
Figure 2:
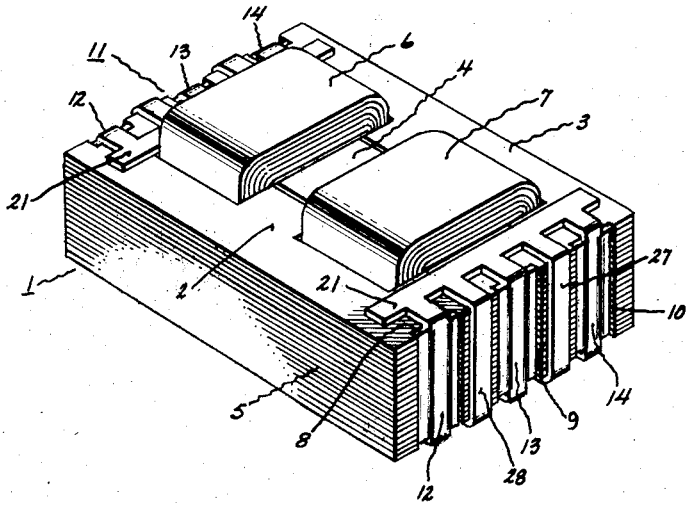
Figure 2 is a view in perspective of a transformer incorporating the improved clamping means of this invention after completion of the assembly.
Figure 3:
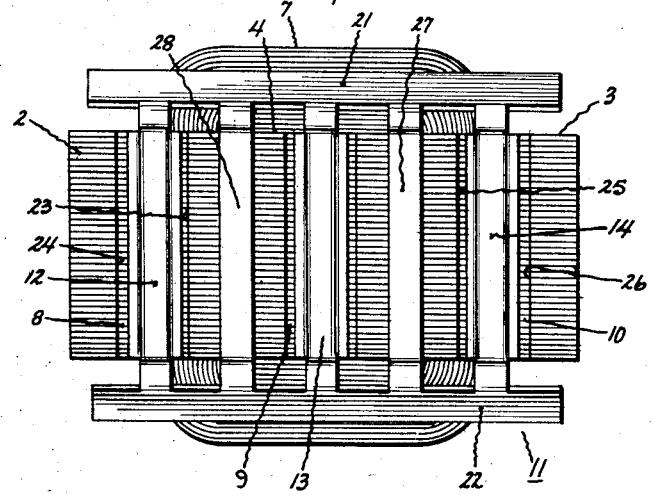
Figure 3 is an end view of the structure shown in Figure 1.

Referring now to Figures 1, 2, and 3 of the drawings, the preferred embodiment of the invention will be explained. There is shown a high-reactor transformer, of the type generally used for operating fluorescent lamps, having a core 1 made of 2 E-shaped sections 2 and 3, and an I-shaped center section 4, the E-shaped sections 2 and 3 being respectively located one on each side of the I-shaped center section 4 as shown. Each section is made up of a plurality of superimposed laminations of relatively thin magnetic material as indicated at 5. In the embodiment set forth, a pair of coils 6 and 7 are provided which are positioned on the center section 4. Coils 6 and 7 have been provided merely in order to illustrate the usual environment of the invention and the electrical connections have been omitted for greater clarity since they do not form a part of this invention.

Three transverse grooves 8, 9, and 10 are provided respectively in the edge of each end of the sections 2, 4, and 3. Grooves 8, 9, and 10 are preferably formed with a rectangular cross-section, as shown, and are substantially parallel to each other when sections 2, 4, and 3 are in assembled relation. It will however, be understood that the rectangular cross-section is not a prerequisite and that any other desired shape may be used with good results. A pair of clamping members 11, preferably formed of slightly resilient material, are provided each having three parallel wedge portions 12, 13, and 14, each having cross-sections transversely bowed substantially in the shape of a U with spreading legs, as shown at 15 and 16, with the ends of the legs seated against the base of the groove, as shown at 17 for portion 12 and groove 8. Wedges 12, 13, and 14 are provided respectively with a pair of portions 18, 19 and 20 extending from each end respectively and respectively connected to a pair of flanges 21 and 22. Referring particularly to Figure 3, it will be observed that wedge portion 12 is offset in groove 8 so that it is closer to side 23 of the groove than to side 24, while wedge 14 is similarly but oppositely offset so that it is closer to side 25 of groove 10 than side 26. Wedge 13 is located substantially centrally within groove 9.

A pair of connecting strips 27 and 28 extend between flanges 21 and 22 substantially parallel to wedge portions 12, 13, and 14. Strips 27 and 28 are so located that when the clamping member 11 is in position the strips extend down over the lines of juxtaposition between the sections 2, 3, and 4. Thus, in addition to its clamping function, member 11 aids to establish a proper flux path for stray flux by providing iron over the gaps between the sections.

Once the core clamp members 11 have been preassembled with the three core sections 2, 3, and 4, respectively as shown in Figures 1 and 3, the bridge portion of each wedge portion, as indicated at 29 in the case of wedge portion 12, is forced downwardly until the wedge portion is substantially flat, as shown in Figure 2. The initial width of wedge portions 12, 13, and 14 is smaller than the width of the grooves 8, 9, and 10 respectively, and when the wedge portions are flattened each one abuts against each side of its associated groove with a predetermined amount of pressure. By this means, the laminations of each section are held in preassembled relationship by engagement of a wedge portion with the sides of its associated groove. It will be seen however, that when the wedge portions 12, 13, and 14 are flattened, wedge portion 12 will abut against side 23 of recess 8 before it reaches side 24, and that wedge portion 14 will abut against side 25 of recess 10 before it reaches side 26. This action causes a clamping between wedges 14 and 10 which causes the three sections 2, 3, and 4 to be tightly clamped together in assembled relationship. Flange 21 may be bent over to contact the laminations, if so desired, as shown in Figure 2. The same action may be taken with flange 22, and it will be seen that in addition to the holding power of wedge portions 12, 13, and 14, the individual laminations will be further maintained together by the engagement of flanges 21 and 22 with the surfaces of the outer laminations respectively.

It will, of course, be understood that it is desirable to provide at least two clamping members 11, as shown in Figure 1. The provision of two such members permits the individual laminations to be securely clamped together at each end of the core 1, and also permits the core sections 2, 3, and 4 to be securely clamped together at each end so that the entire core becomes an integral unit.

Referring now to Figure 4, the second embodiment of this invention will be set forth, using like numerals for like parts. As before, a core 1 is provided and is made up of three sections 2, 3, and 4, with coils such as 7 being wound over the center core section 4. A clamping member 30 is provided with parallel wedge portions 31, 32, and 33 which are seated, as before, in grooves 8, 9, and 10 respectively. Wedge portions 31, 32, and 33 are formed oppositely to wedge portions 12, 13, and 14 in Figure 1, that is, they are formed with expanding legs facing outwardly rather than inwardly and with the light of the U seated in the groove. Wedge portions 31, 32, and 33 respectively have connecting portions 34, 35, and 36 at each end, with the two sets of portions 34, 35, and 36 being connected respectively to a pair of flanges 37 and 38. Flanges 37 and 38 are shown as being slanted oppositely to the flanges 21 and 22 of Figure 1, that is, they slant toward the outside edge of the core rather than toward the inner edge thereof. It will, however, be understood that the flanges may be formed in any manner desired and that those set forth above are principally for purposes of illustration. The main function of the flange is to join the portions 31, 32, and 33 in order correctly to space them.

Wedge portions 31, 32, and 33 are located in grooves 8, 9, and 10 in the same fashion as wedge portions 12, 13, and 14 in Figure 1, that is, wedge portion 31 is closer to side 39 of groove 8 than to side 40 and wedge portion 33 is closer to side 41 of groove 10 than to side 42, while wedge portion 32 is approximately centered within groove 9.

In order to assemble the core into an integral unit, proper tools (not shown) may be used to force down the legs of the U-shaped members so that the members become substantially flat, as was explained in connection with the first embodiment (Figures 1, 2, and 3). This will, as explained before, operate both to hold the individual laminations together and to hold the core sections together. Again, the flanges 37 and 38 may be bent down over the surfaces of the core if so desired.

Referring now to Figure 5, yet another embodiment of this invention will be set forth using the same numerals for like parts. Grooves 8 and 9 are respectively provided in sections 2 and 4 of core 1, in exactly the same manner as set forth for Figure 2. A clamping member 43 is provided having wedge portions 46 and 45 seated in grooves 8 and 9 respectively. The principal difference between this embodiment and the embodiment of Figure 4 is in the shape of wedge portions 45 and 46. In this instance they are formed as round U-shaped members rather than with spreading legs. In other respects, the construction is the same as that of Figure 4. It will, however, be seen from this embodiment that the wedge portions may be formed in a variety of ways, so long as it is possible substantially to flatten them to hold the core as an integral unit.

Referring now to Figure 6, yet another embodiment of the invention will be set forth. In this instance there is provided a core 62 which is made up of two abutting E-shaped sections 47 and 48 which are respectively built up of relatively thin laminations of magnetic material. Suitable coils, such as 49, are arranged over the center leg 50 which is formed by the center legs of the two E-shaped members. A pair of grooves 51 and 52 are formed in core sections 47 and 48 respectively, one groove on each side of each section. A clamping member 53 has a pair of wedge portions 54 and 55 arranged to seat in grooves 51 and 52 respectively, as shown in the figure. A pair of these clamping members are provided, one for each pair of grooves 51 and 52. The wedge portions 54 and 55 are, in this particular embodiment, shown as being of the same type as those set forth in Figure 1. It will, however, be understood that any other type of wedge portion may be used, as stated above. As has been fully explained in connection with Figure 1, wedge portions 54 and 55 are secured at their ends to a pair of flanges 56 and 57 respectively, the wedge portions being so secured to the flanges that wedge portion 54 is seated in groove 51 so that it is closer to side 58 of the groove than to side 59, while wedge portion 55 is seated in groove 52 so that it is closer to side 60 of the groove than to side 61. Thus, when a tool (not shown) is applied to flatten out the wedge portions within the grooves respectively, wedge portions 54 and 55 will contact the inner sides 58 and 60 of grooves 51 and 52 respectively, and will tend to force the two core sections 47 and 48 together. At the same time, each wedge portion will abut against each side of its associated groove in order to maintain the individual laminations in assembled relation. As before, flanges 56 and 57 may be flattened to provide further holding for the individual laminations, or may be left as shown.

It will be observed that the invention set forth above provides a unitary, simply manufactured, member which performs the dual functions of holding the individual laminations in assembled relationship and of tightly clamping the different core sections together in assembled relationship so that, by itself, the novel core clamp of this invention maintains all elements of the core as an integral unit.

While this invention has been explained by describing particular embodiments thereof it will be apparent that improvements and modifications may be made without departing from the scope of the invention as defined in the appended claims.

What we claim as new and desire to secure by Letters Patent of the United States is:

1. In combination, a core comprising at least two sections, each of said sections comprising a plurality of thin superimposed laminations of magnetic material, said sections being arranged in lateral juxtaposition, each of said sections having a groove formed on one side extending across said laminations, each groove having inner and outer sides with said inner side closer to the other groove than said outer side, and a core clamping member comprising at least two wedge portions each extending within a respective one of said grooves, means connecting said wedge portions at each end thereof respectively, each of said wedge portions having a flattened portion thereof compressed against an inner side of one of said grooves and the portions of said connecting means intermediate said two wedge portions being mechanically strained in tension, whereby to exert a clamping force urging said two sections together.

2. For use with laminated juxtaposed core sections each having a groove extending across the laminations thereof on a common side, a core clamping member comprising a rectangular metal strip having a pair of parallel spaced transversely bowed wedge portions and a pair of flange portions connecting said wedge portions at each end thereof, said wedge portions having a width smaller than that of said grooves and having a center-to-center spacing less than that of said grooves whereby said transversely bowed wedge portions of said clamping member may be inserted within said grooves and flattened to exert pressure for clamping said core sections together and for securing said laminations together.

3. The core clamping member of claim 2 wherein said transversely bowed wedge portions each have a U-shaped cross-section with spreadable legs.

4. The core clamping member of claim 2 also comprising a flux linking strip connected to and extending between said flange portions parallel to said wedge portions for overlying the line of juxtaposition of the cores clamped together by said clamping member.

5. In combination, at least two juxtaposed laminated core sections forming together at least one continuous side and each having a groove formed on said side extending across the laminations thereof, each groove having inner and outer sides with the inner side closer to the other groove than the outer side; and a core clamping member comprising at least two spaced parallel transversely bowed wedge portions each arranged to extend within a respective one of said grooves and a pair of flange portions connecting said wedge portions at each end thereof respectively, said wedge portions each having a width smaller than the width of said grooves respectively and being spaced to be offset in said grooves closer to said inner sides than to said outer sides of said grooves respectively so that upon flattening their edges abut at least said inner sides thereby tightly to clamp said core sections together.

6. The combination of claim 5 wherein said wedge portions each have a U-shaped cross-section with spreadable legs and extend within said grooves with said legs toward the rear thereof.

7. The combination of claim 5 wherein said wedge portions each having a U-shaped cross-section with spreadable legs and each extend within its corresponding groove with the bight of said U seated within the groove.

8. In combination, a core comprising at least two sections, each of said sections comprising a plurality of thin superimposed laminations of magnetic material, said sections being arranged in lateral juxtaposition and forming together at least one continuous side of said core, each of said sections having a groove formed on said side extending across said laminations, each groove having inner and outer sides with the inner side closer to the other groove than the outer side; and a core clamping member comprising at least two wedge portions, each extending within a respective one of said grooves and flange means connecting said wedge portions at each end thereof respectively, said wedge portions being offset in the grooves respectively to be more adjacent said inner side thereof and having a partially flattened transversely bowed cross-section with their edges abutting at least said inner sides of said grooves respectively thereby tightly to clamp said core sections together and to secure said laminations together.

9. In combination, at least two laminated core sections juxtaposed to form together at least one continuous side and each having a groove formed on said side extending across the laminations thereof, each groove having inner and outer sides with the inner side closer to the other groove than the outer side; and a core clamping member comprising at least two wedge portions each extending within a respective one of said grooves and each having oppositely directed flattened legs, one flattened leg of each wedge portion abutting and exerting a force against said inner side of its accommodating groove to clamp said two sections together and to secure said laminations together.

10. The combination of claim 9 wherein said flange portions overlie and exert a force against the outermost laminations of said core sections to clamp the laminations thereof together.

11. The combination of claim 9 wherein said strip member also comprises a flux linking strip connected to and extending between said flange portions parallel to said wedge portions for overlying the line of juxtaposition of the cores clamped together by said strip member.

12. In combination, at least two laminated juxtaposed core sections each having a groove extending across the laminations thereof on a common side, a metal strip member having a pair of wedge portions each within a respective one of said grooves and a pair of flange portions connecting said wedge portions at each end respectively, said wedge portions each having flattened legs abutting against opposite sides of its accommodating groove, said wedge portions having a center-to-center spacing less than that of said grooves whereby said flattened legs exert a force to clamp said two sections together and to secure said laminations together.

References Cited in the file of this patent

UNITED STATES PATENTS

| | | |
|---|---|---|
| 2,424,443 | Evans | July 22, 1947 |
| 2,467,218 | Mittermaier | Apr. 12, 1949 |
| 2,610,225 | Korski | Sept. 9, 1952 |

FOREIGN PATENTS

| | | |
|---|---|---|
| 669,296 | Great Britain | Apr. 2, 1952 |

OTHER REFERENCES

Kimble, Abstract of Ser. No. 703,322, published July 12, 1949.